Patented Feb. 14, 1939

2,146,899

UNITED STATES PATENT OFFICE 2,146,899

COMPOUNDS FROM ACETO-HALOGEN-SUGARS AND NICOTINIC ACID AMIDE AND PROCESS FOR THE MANUFACTURE OF SAME

Paul Karrer, Zurich, Switzerland, assignor to Hoffmann-La Roche Inc., Nutley, N. J., a corporation of New Jersey No Drawing. Application November 24, 1937, Serial No. 176,358. In Switzerland December 8, 1936

8 Claims. (Cl. 260—211)

When aceto-halogen-sugars, such as aceto-bromo-glucose, aceto-bromo-arabinose or aceto-bromo-ribose, are acted upon nicotinic acid amide in indifferent solvents, such as dioxan, compounds are formed which correspond to the formulae I and II.

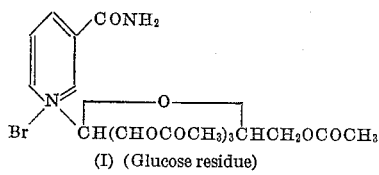

(I) (Glucose residue)

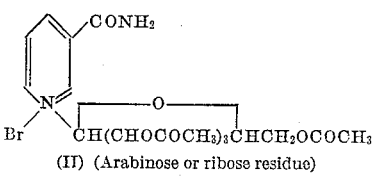

(II) (Arabinose or ribose residue)

In these the acetyl groups can be split off by saponification, for instance with very dilute hydrobromic acid. Many years ago a compound of pyridine with aceto-bromo-glucose was obtained accidentally by E. Fischer and K. Raske (Berichte der Deutschen Chemischen Gesellschaft, vol. 43, 1910, page 1750). However, it could not be anticipated from this whether derivatives of pyridine, especially nicotinic acid amide, would also combine with aceto-halogen-sugars, the less so since the investigators in question found that also the addition of aceto-bromo-glucose to pyridine only succeeded in the presence of a catalyst, a little phenol. This addition was found to be unnecessary in the present process.

The new compounds are to be used as intermediates in the manufacture of synthetic substances with enzymatic action similar to or identical with cozymase.

Example 1

12.1 parts by weight of nicotinic acid amide are dissolved in dioxan while heating, whereupon 41.1 parts by weight of aceto-bromo-glucose are introduced. The solution is then left to stand for 48 hours at 37° C. During this time the 3-carboxylic acid amide of N-tetracetyl-glucosido-pyridinium-bromide crystallises. To remove impurities, the product is twice boiled out with dioxan and once with benzene and afterwards recrystallised from alcohol.

The new compound crystallises in colourless needles which decompose between 192 and 200° C. It is easily soluble in water, moderately easily soluble in alcohol, and insoluble in ether and benzine. By reduction in alkaline solution the 3-carboxylic acid amide of N-tetracetyl-glucosido-dihydropyridine is obtained.

Example 2

The compound from nicotinic acid amide and laevo-aceto-bromo-arabinose is obtained by condensing 12.1 parts by weight of nicotinic acid amide with 33.9 parts by weight of aceto-bromo-arabinose in dioxan under the conditions described in Example 1. The 3-carboxylic acid amide of N-triacetyl-arabinosido-pyridinium-bromide is chiefly found in the dioxan mother-liquor; it does not tend to crystallise. By reduction in alkaline solution the 3-carboxylic acid amide of N-triacetyl-arabinosido-dihydropyridine is obtained.

In the same manner as the compound resulting from aceto-bromo-arabinose and nicotinic acid amide described in this example the 3-carboxylic acid amide of N-triacetyl-ribosido-pyridinium-bromide can be obtained from nicotinic acid amide and d-aceto-bromo-ribose.

I claim:

1. A compound selected from the group of substances having the structure

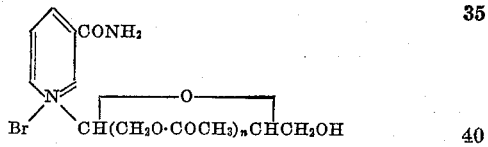

wherein $n$ is an integer selected from the group consisting of 2 and 3.

2. The 3-carboxylic acid amide of N-tetracetyl-glucosido-pyridinium-bromide.

3. The 3-carboxylic acid amide of N-triacetyl-arabinosido-pyridinium-bromide.

4. The 3-carboxylic acid amide of N-triacetyl-ribosido-pyridinium-bromide.

5. Process for the manufacture of compounds from aceto-halogen-sugars and nicotinic acid amide which comprises reacting aceto-halogen-sugars with nicotinic acid amide in indifferent solvents.

6. Process for the manufacture of 3-carboxylic acid amide of N-tetracetyl-glucosido-pyridinum-bromide which comprises reacting aceto-bromo-glucose with nicotinic acid amide in indifferent solvents.

7. Process for the manufacture of 3-carboxylic acid amide of N-triacetyl-arabinosido-pyridinium-bromide which comprises reacting laevo-aceto-bromo-arabinose with nicotinic acid amide in indifferent solvents.

8. Process for the manufacture of 3-carboxylic acid amide of N-triacetyl-ribosido-pyridinium-bromide which comprises reacting d-aceto-bromo-ribose, with nicotinic acid amide in indifferent solvents.

PAUL KARRER.